June 26, 1951 W. A. MARRISON 2,558,187

SELECTIVE SIGNALING GENERATOR IN WHICH CODED INFORMATION IS RECORDED ON A MAGNETIZABLE MEDIUM

Filed Dec. 15, 1949 6 Sheets-Sheet 1

INVENTOR
W. A. MARRISON
BY J W Schmied
ATTORNEY

June 26, 1951 W. A. MARRISON 2,558,187

SELECTIVE SIGNALING GENERATOR IN WHICH CODED INFORMATION IS RECORDED ON A MAGNETIZABLE MEDIUM

Filed Dec. 15, 1949 6 Sheets-Sheet 2

INVENTOR
W. A. MARRISON
BY J W Schmied
ATTORNEY

INVENTOR
W. A. MARRISON
BY J W Schmied
ATTORNEY

June 26, 1951 W. A. MARRISON 2,558,187
SELECTIVE SIGNALING GENERATOR IN WHICH CODED INFORMATION IS RECORDED ON A MAGNETIZABLE MEDIUM
Filed Dec. 15, 1949 6 Sheets-Sheet 4

INVENTOR
W. A. MARRISON
BY J W Schmied
ATTORNEY

INVENTOR
W. A. MARRISON
BY J W Schmied
ATTORNEY

INVENTOR
W. A. MARRISON
BY J W Schmied
ATTORNEY

Patented June 26, 1951 2,558,187

UNITED STATES PATENT OFFICE 2,558,187

SELECTIVE SIGNALING GENERATOR IN WHICH CODED INFORMATION IS RECORDED ON A MAGNETIZABLE MEDIUM

Warren A. Marrison, Berkeley Heights, N. J., assignor to Bell Telephone Laboratories, Incorporated, New York, N. Y., a corporation of New York Application December 15, 1949, Serial No. 133,191

18 Claims. (Cl. 179—90)

This invention relates to signal transmitters, and more particularly to a selective signaling transmitter, in which coded pulse signals at one or more frequencies convey desired selective information to a central switching station.

An object of the invention is to provide a signal transmitter capable of practically unlimited extension as to the number of separate signals that may be originated.

Another object of the invention is to provide a signal in addition to a calling signal, which identifies the particular transmitter which originated any calling signal.

Another object is to provide a signal transmitter employing pulse codes which already have considerable application, thus simplifying the adaptation of the transmitter to existing systems.

A feature of the invention is that the separate component parts comprising the mark and space of the code signal are distinguished from each other by differences in phase in order to render the system as a whole very little affected by the level, or normal changes in level, in the received signal.

Another feature is a transmitter in which a desired code, such as a telephone number, may be preset by the operation of keys in a simple arrangement, said preset information remaining a property of the instrument, and ready for instant use, until reset for some other information.

A further object of the invention related to number calling, is to provide means whereby scales of number notation greater than ten, such as a vigesimal system based on a scale of twenty, may be used in order to vastly extend the number of separate different signals that may be transmitted.

An important feature of the invention is the general means by which coded information is recorded on a magnetizable medium from which it may be reproduced at any subsequent time, or rerecorded at any subsequent time.

Another feature of the invention is that a visual indicator shows at all times the information actually recorded on the magnetizable element. Whenever any such code information is changed, the visual indication is changed to correspond.

An additional feature of the invention is that the signal transmitter may transmit its own standard of phase in such a way that it becomes unnecessary to employ a precise speed control of mechanism such as now used in conventional dialing devices.

A further feature is that once a number has been preset into the device, that same number may be called any number of times without further manipulation except to tension a spring to supply the transmitting energy. On the other hand, the preset number may be changed rapidly at any time.

A mechanical feature of the invention is a coupling device for allowing one set of keys to function in more than one capacity, in particular to set up codes in either of two categories, according to either decimal or givesimal systems of number notation.

Other features will appear in the course of the detailed discussion which follows, illustrated by the accompanying drawings.

Operation of the invention is accomplished by a mechanism the central element of which is a toothed wheel, or the equivalent as hereinafter described, made of magnetizable material, such for example as Alnico, vicalloy or iron oxide impregnated in a plastic, which may be magnetized in groups of poles in specific ways by the operation of suitable keys.

During the magnetizing or coding operation, each key causes a different array of small magnets to be presented to a sector of the periphery of the magnetizable element and magnetizes by induction a code signal upon these sectors one by one until the entire operating part of the magnetizable element is coded. The magnetizable element remains so magnetized until remagnetized at some later time in a new code arrangement by a new sequence of key operations.

Meanwhile, the magnetized element may be operated at any time to transmit an electric code signal corresponding to the configuration of the magnet poles, by mechanical means, the magnetized element to be moved past a suitable wire wound pick-up device, thereby generating a current having a basic frequency corresponding to the rate of scanning of the poles. This current induced in the pick-up coil is modulated in accordance with the strength and polarity of the magnetized poles. In the embodiment shown herewith a circular magnetizable disc with uniformly spaced teeth is shown as the magnetizable element. Other similar arrangements to achieve the same general result may be used to make the device more compact, faster in operation or to employ different materials, without departing from the invention.

By combining the code signals from all the sectors a large number of possible combinations may be obtained, depending, of course, upon the number of keys and the manner of coding each individual sector, as well as upon the number of consecutive sectors employed in one complete signal. As an example, in the simple case of using on one code disc a succession of eight sectors, each coded in scale-of-ten notation, the total number of distinguishable signals would be one hundred million. By the use of scales of notation in excess of ten, the number of distinguishable code signals may be vastly increased as described hereinafter.

A preferred embodiment of the invention is illustrated by the accompanying drawings in which:

Fig. 1 is a perspective drawing showing the external appearance of a telephone subscriber's station set embodying the various features of the invention, here shown without the handset which normally rests upon the cradle. This figure shows a push-button assembly 21 for registering number information, a viewing device 22 for indicating the number which has been preset, and reset devices 23 and 24 for the purpose of rewinding the transmitting spring when it is desired to make successive calls to a number already registered, and for restoring the number transmitter to operated position when it is desired to change a number that has previously been preset.

Fig. 2 shows a side view cross-section of the internal mechanism illustrating especially the location and function of the number keys 21, the magnetizing magnets 31—35 in their relation to the code disc 30, and, as far as this view permits, the operation of the visual indicator 22. This drawing also indicates the location of the section drawings of Figs. 3, 4, 5 and 6 which show in further detail the arrangement and functioning of the various parts.

Fig. 3 is a sectional plan view along the lines 3—3 of Fig. 2 showing the arrangement of key bars 51—60, coding bars 41—45 and their connection with the five coding magnets 31—35.

Fig. 4 is a sectional plan view along the lines 4—4 of Fig. 2 showing particularly the arrangement of keys 21, the arrangement of visual indicators 22 with their operating mechanism, and the magnetizable code disc 30 with its actuating mechanism.

Fig. 5 is a front profile section taken along the lines 5—5 of Fig. 2, showing more detail of the visual indicator setting mechanism, and of the mechanism for advancing the magnetizable code disc one sector at a time while registering a number, as well as the spring 26 which stores the energy for driving the generator during the transmitting of number information. An electromagnetic release 27 is indicated which, under control of current from central office, releases the number transmitter as soon as the information can be utilized in the required switching operation.

Fig. 6 is a rear profile section view along the lines 6—6 of Fig. 2 showing further detail of the magnetizable code disc elements 30, the pick-up wire-wound magnets 36 and 37 for transmitting the magnetically recorded information, and the permanent magnets 30, operable by the number keys at the front of the instrument, for recording in code the desired number information.

Figures 1, 9:
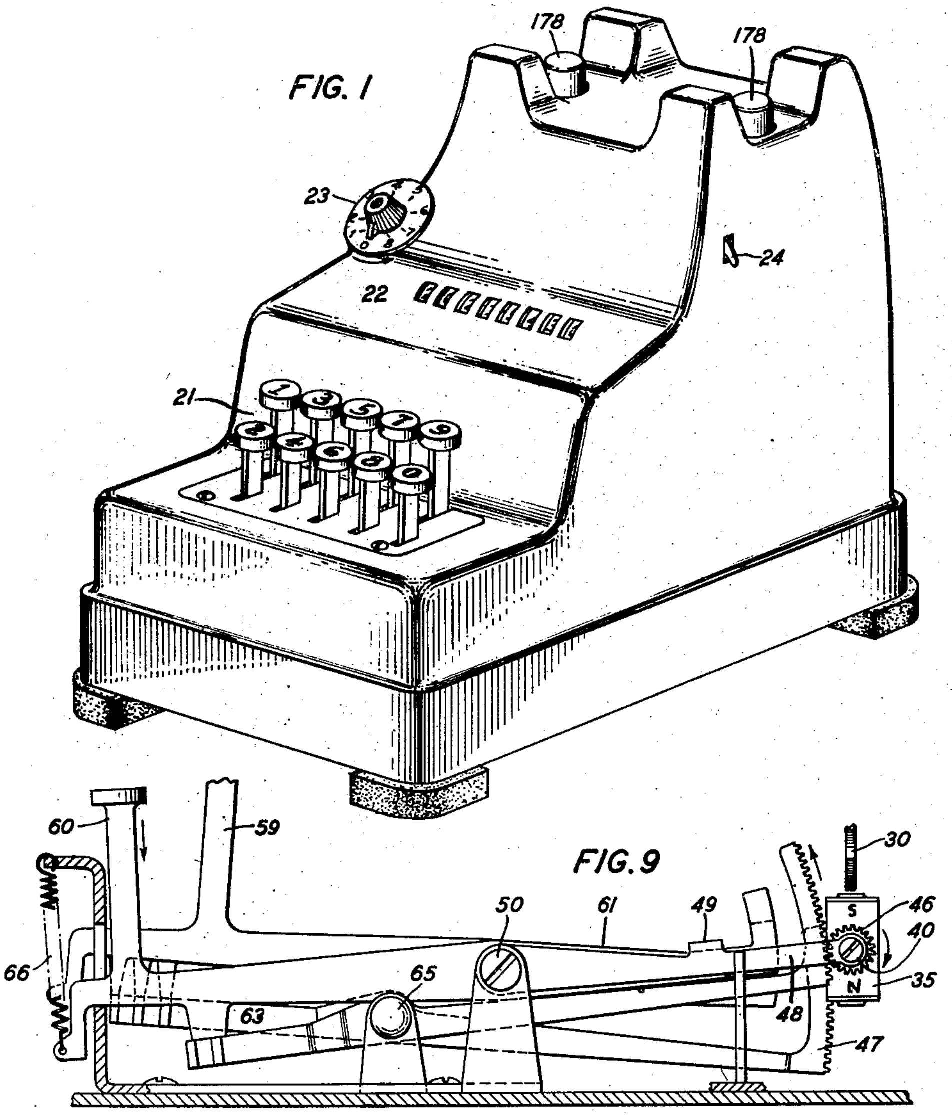
Figure 10:
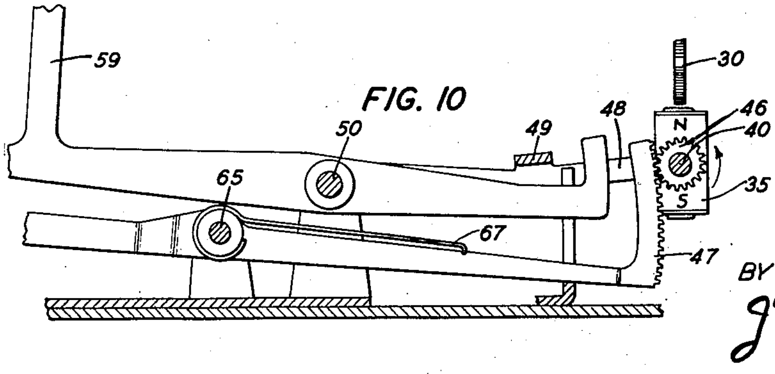

Figs. 9 and 10 on sheet No. 1 of the drawings, show in detail the operation of the number keys in controlling the motion of the permanent magnets during a coding operation.

Figure 11:
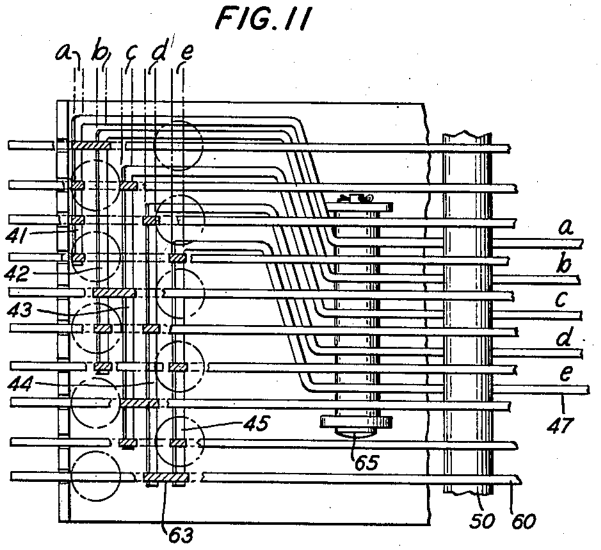

Fig. 11 shows an arrangement whereby ten keys may select the ten combinations of two-out-of-five code and apply them to the levers which control the code magnets.

Figure 12:
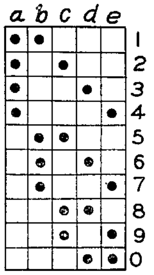

Fig. 12 shows one possible sequence of relations between the ten operating keys and the ten two-out-of-five code combinations chosen in a logical sequence but having no special property other than the one-to-one correspondence between the said ten keys and the ten different code combinations.

Figure 13:
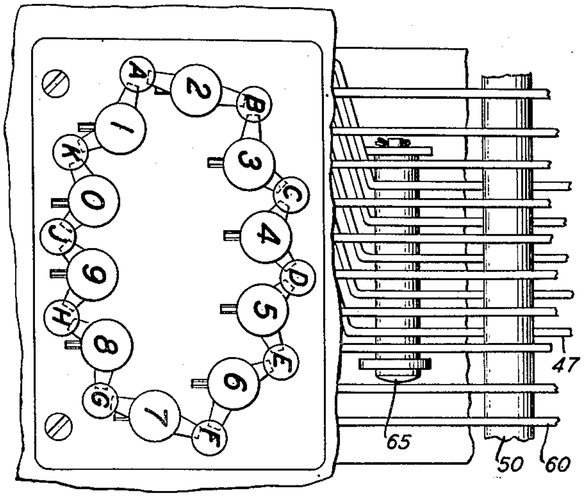

Fig. 13 shows an arrangement of keys consisting of a primary lettered set corresponding in all essential respects with the ten keys of Fig. 11, but having in addition an auxilarly set of distinctively numbered keys arranged so that the operation of any key of the auxiliary set will cause the operation of two adjacent keys of the first set. The arrangement is such that the ten keys of the auxiliary set may cause the selective operation of the ten adjacent pairs of keys of the first set, thus enabling the use of a vigesimal system of number notation as well as a decimal system.

Figure 14:
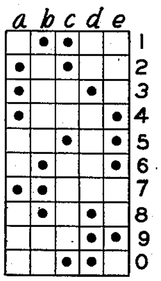

Fig. 14 shows one suitable sequence of relations between the ten primary keys of Fig. 13 and the ten corresponding two-out-of-five code combinations. This arrangement has the desirable property that each of the two-out-of-five code combinations has one code element in common with the next adjacent combination in the sequence of ten.

Figure 15:
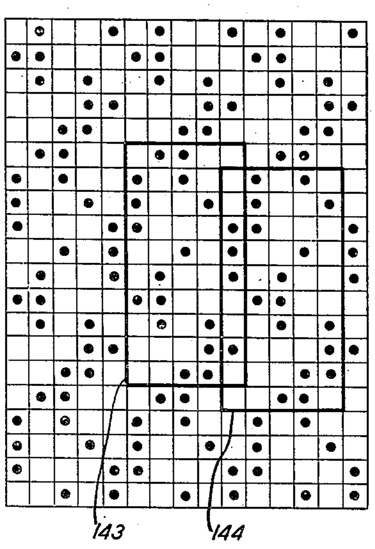

Fig. 15 shows the relation between the set of code combinations illustrated in Fig. 14 and a number of other such arrangements that may be derived from it by the transposition of rows or columns, or both, all such resulting combinations having the property in common that each two-out-of-five code combination has one code element in common with the next adjacent in the sequence of ten. It is self evident that the mirror image of each such rearrangement of rows and columns also has this property and is one of the same family of code arrangements.

Figure 16:
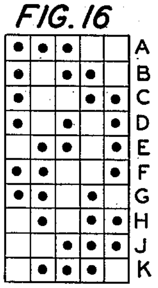

Fig. 16 shows the resulting three-out-of-five combination by the operation of the primary keys of Fig. 13 in adjacent pairs, as by operation of the auxiliary keys of that figure. The code combinations of Fig. 16 are derivable from those of Fig. 14 by arranging the combinations of Fig. 14 in pairs. Thus in Fig. 16 the row A corresponds to rows 1 and 2 in Fig. 14, and similarly throughout, the final row, K, being the combination of rows 0 and 1.

Figure 17:
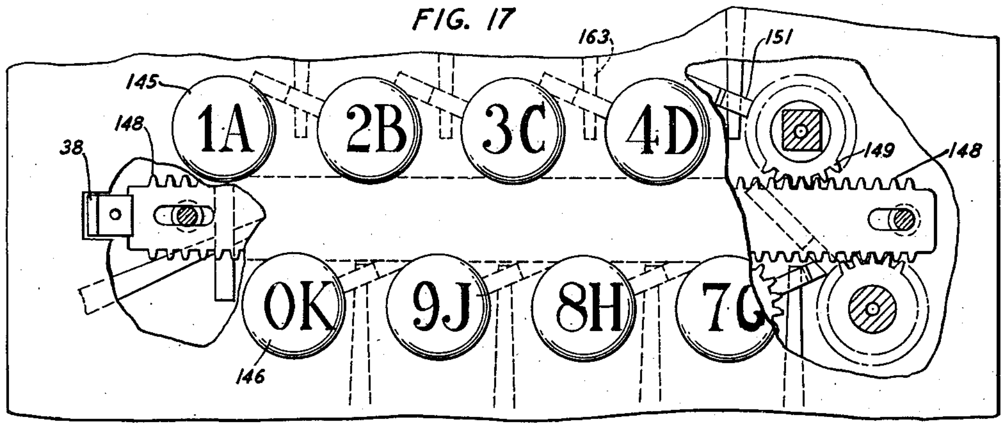
Figure 18:
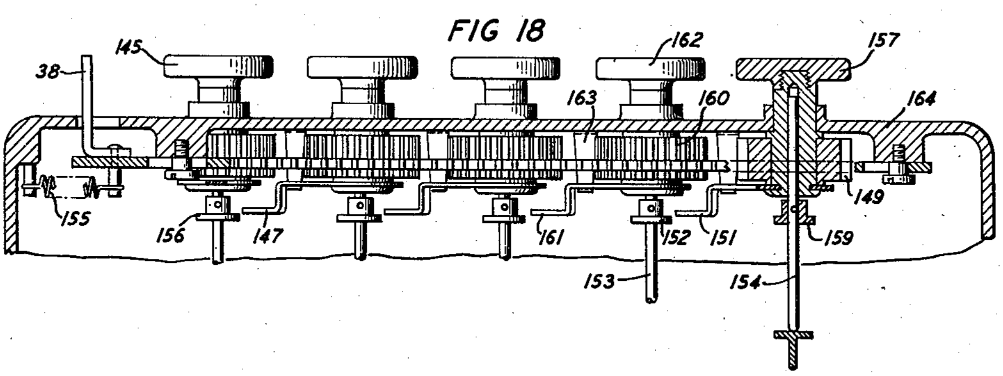

Figs. 17 and 18 illustrate, respectively, plan and profile views of a keyboard for accomplishing the operation of two adjacent primary keys, such as described in relation to Fig. 13, without a set of auxiliary keys one for each such combination. As illustrated in these figures, the motion of a select lever 38 operates a simple mechanism which permits the operation of any key in the primary set to cause the functioning of that key and the one next adjacent to it on one side, for example on the side toward increasing numbers. The select lever may be used or not, at will, permitting the selection of any one out of a total of 20 possible code combinations at each coding operation for use in a vigesimal system of notation.

Figures 19, 20:
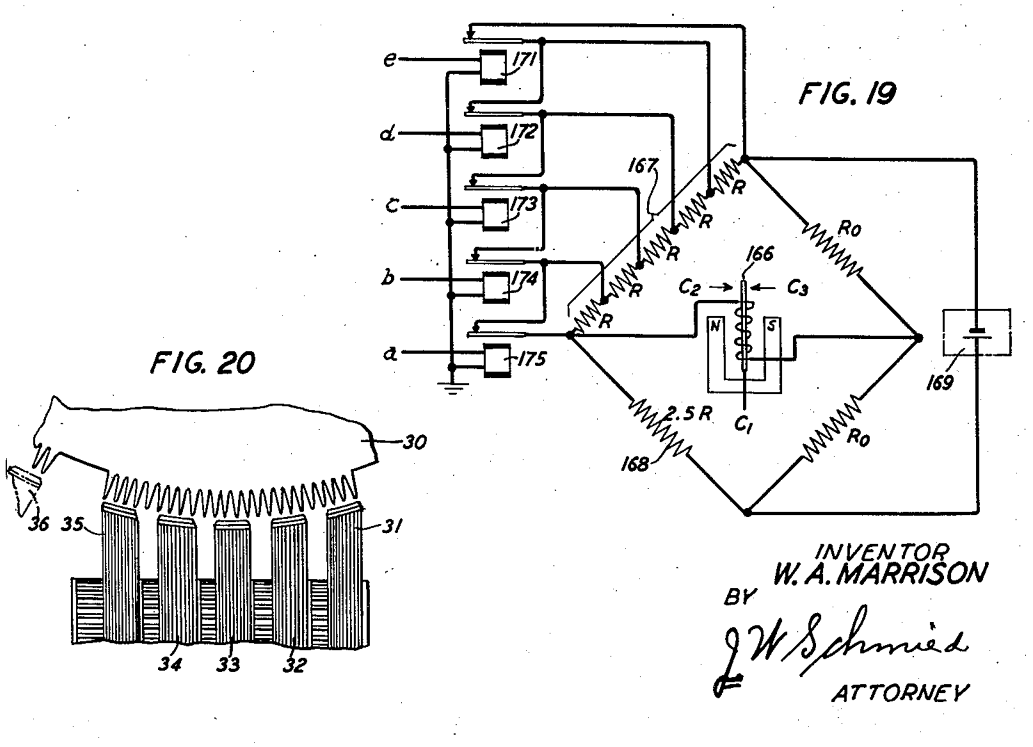

Fig. 19 illustrates one form of circuit which may be employed in a central office for the separation of two different categories of code signals. Other arrangements than that shown in Fig. 19 may be employed to perform the same function at the central office.

Fig. 20 is an enlarged detail drawing showing the operating relation of the five inductor magnets 31—35 to the serrated periphery of magnetic code disc 30.

A detailed description of the invention and its operation follows with reference to the aforementioned drawings. The broad purpose of the invention is to provide means for presetting an instrument, such as a subscriber's telephone set, so that the designation for calling any other subscriber may be transmitted without delay to the central office in a manner advantageous for rapid switching and control purposes.

When a telephone subscriber using the station set of Fig. 1 anticipates making a call to any number, not already shown on the number indicator 22 he presses the keys 21 in proper sequence corresponding to the desired number. This registers the desired number information upon magnetic disc 30 in form suitable for subsequent automatic electrical transmission over the communication circuit, and also visibly indicates the registered number at the indicator 22. In the present invention some number is always registered on the automatic transmission device and that same number is displayed on the visual indicator 22. Any change in either registration or indication, caused by the operation of keys 21, is accompanied by the appropriate change in the other.

After a desired number has been suitably registered, nothing further need be done by the calling party other than to lift the telephone handset from the cradle switch. As soon as this is done central office is alerted, and, as soon as switching facilities are available, an electrical impulse from central office trips a magnet shown at 27 in Fig. 5, which releases the number signal as hereinafter described. In general the delay between lifting the handset and transmitting the number information may be negligible being in the order of hundredths of a second in most instances. Nohting further need be done by the calling party except to communicate with the called subscriber or to accept a "busy" or "no answer" signal.

In the present invention, the calling of a number does not cause the registration of such number to be erased from either the electrical transmitting mechanism or from the visual indicator. All that is required to call the same number at any subsequent time is to tension the transmitting spring, seen at 26 in Fig. 5, by the operation of knob 23 each time a repeat call is to be made. After making a call, one may either reset the same number as just described, or set up an entirely new number by the operation of keys 21.

If, after setting up a number, it is for any reason desired to change the registered number before making a call, the release lever 24 will restore the number mechanism to the condition it has normally just after a call has been made. In order to make such a change of registered number, it is only necessary to operate release lever 24 and proceed to set up the desired number as usual by means of the keys 21.

The means by which these functions may be accomplished will now be described referring in greater detail to the drawings of Figs. 1 through 20. In the course of this description an additional number of desirable features of the invention will be described.

Figure 2:
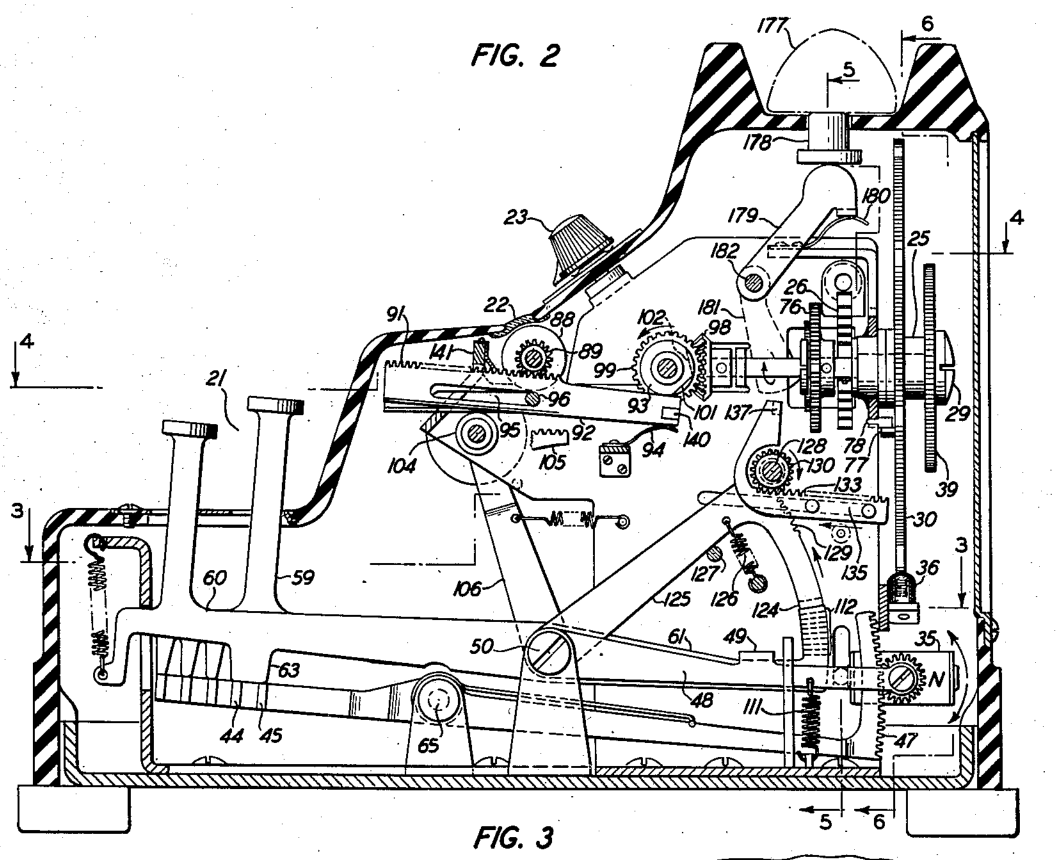
Figure 3:
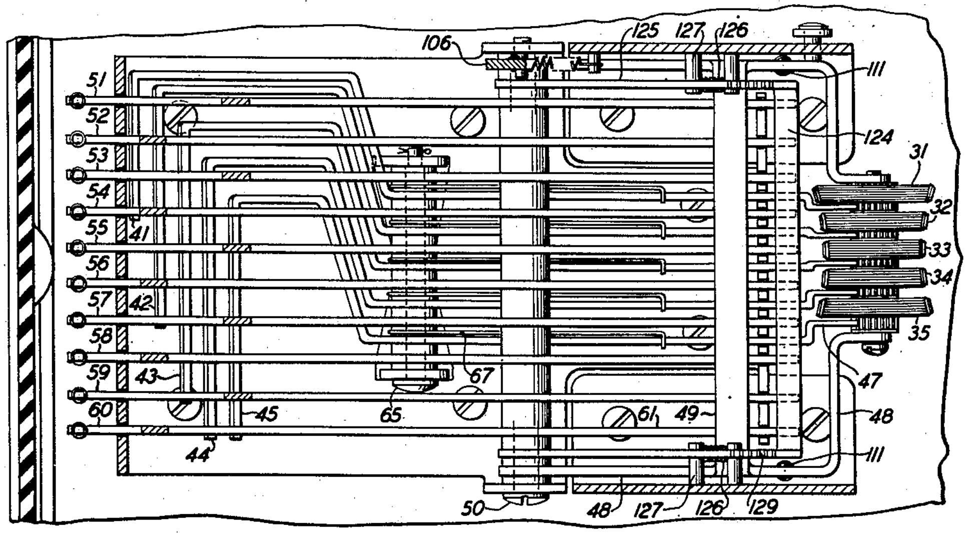

Referring particularly to Fig. 2, 30 represents a disc of magnetizable material mounted upon a rotatable spindle 25, bearing also a second magnetizable disc 39. As indicated in schematic form only, these discs are provided with a considerable number of salient poles, or otherwise magnetizable regions, so that as the discs 30 and 39 rotate they generate currents in the stator coils 36 and 37, as seen clearly in Fig. 6. These generated currents are of suitable frequencies for transmission over telephone or similar lines. In one embodiment of the invention the frequency of the current controlled by disc 39 should be exactly half of that controlled by disc 30, and the phase relation between the poles on the two discs should conform to a fixed space pattern so that, when the generator is in motion, the signals generated by the two discs will bear a definite phase relation to each other.

Figure 6:
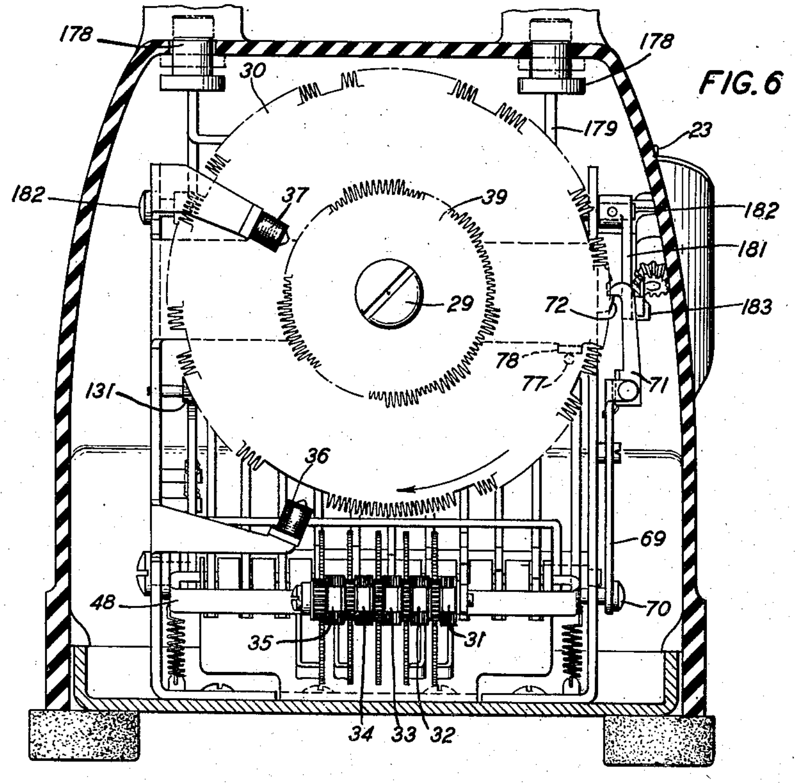

An essential feature of the invention is the means for magnetizing the disc 30 through the control by keys of the five inductor magnets 31—35 shown on Figs. 2 and 6. The operation is such that, when any one of the ten keys 21 in the numbered sequence from 1 to 0 is operated, all five inductor magnets 31—35 are rotated through 90 degrees and moved to contact, or near contact, with the periphery of magnetizable disc 30. The proximity of inductor magnets 31—35 to the periphery of magnetic code disc 30, when the former are rotated into operating position, is shown in greater detail by the drawing of Fig. 20. By means described hereinafter, two of the magnets are rotated in one direction and three in the other direction so that when a key is depressed a two-out-of-five magnetic pattern is impressed upon the magnetic disc in the sector region embraced by the five magnets. Each of the inductor magnets 31—35 magnetizes by induction a group of poles on the magnetic disc so that the desired code for each digit appears as a succession of five such groups magnetized in a choice of sequences of north and south poles. One complete set of codes for all digits impressed in this way would be the ten possible combinations of two north poles and three south poles. Another complete set would be the ten different combinations of three north poles and two south poles. These two sets of codes are distinguished from each other by means which will be described.

A mechanism for selecting such code combinations is illustrated in Figs. 2, 3, 6, 9, 10 and 11. The five polarizing magnets 31—35, of which 35 in Figs. 9 and 10 is typical, are mounted on a spindle 40 in such a way that they may be rotated by the relative motions of one of the pinion gears 46 and the corresponding segment gear 47. The entire spindle 40 is mounted upon a rocker arm 48 whose axis of motion is at 50. A bar 49 spanning from one side to the other of the rocker arm rests just over the extensions of the key levers, such as 61, being the extension of key numbered 0 in Figs. 2 and 9. The operation downward therefore of any one of the keys 21 will serve to raise rocker arm 48 and hence move the five magnets 31—35, of which 35 is typical, toward the disc 30. There are ten levers such as 61, one for each of the ten keys.

The selection between right-hand and left-hand rotation of the magnet 35, and the consequent effect of magnetization on disc 30, is determined by the selection of two among five levers of which 62 is typical. Lever 62 is attached integrally with gear segment 47 and its motion relative to the pinion gear 46 causes this selection. Tabs projecting downward, such as indicated at 63 associated with key numbered 0 in Fig. 2, are provided to engage certain of the five levers such as 62. In particular, in the present description, each of the ten key levers is provided with tabs that will engage two of the five select levers. The ten such different arrangements are distributed among the ten key levers in a manner suitable for a particular code. The plan of one such possible allotment of keys and levers is illustrated in the diagram Fig. 12 in which the ten numbered selections are designated by the numbers 1 to 0, inclusive, and the five elements, selected in groups of two, are designated by letters *a* to *e*, inclusive. One physical arrangement of the keys with their select tabs and five select levers is illustrated in Fig. 11. The select operation of key No. 6 in Fig. 11, taken as typical, is that when the key is operated, the tabs 63 and 64 engage the extensions of the select levers *b* and *d* and thereby control the proper north or south selection.

The manner of producing this selection is illustrated in Figs. 9 and 10. It should be pointed out that, no matter which of the ten keys is operated, all five of the magnets are moved from the horizontal rest position shown by 35 in Fig. 2 to one of the vertical positions shown in Figs. 9 and 10. If when a key such as 0 is depressed, one of the select levers such as 62 is operated by a tab such as 63, the corresponding gear segment 47 will move upward a greater amount than the center of gear 46, so the gear and the magnet associated with it will rotate clockwise. Similarly, if a key is operated which does not have a tab that engages the lever 62, the lever will remain stationary and, as the pinion 46 moves upward, it will be forced to rotate counterclockwise. The proper proportions to obtain rotation of the magnets through just 90 degrees is accomplished by choosing proper proportions between the lever lengths and gear sizes. It is evident, for example, that the distance between the centers 65 and 40 must exceed the distance between centers 50 and 40.

After a key is operated in Figs. 9 and 10 as just described, and is released again after having encoded a number signal on one of the segments of the code disc 30. The key is restored to its original position by its restoring spring 66 and the code lever is restored by its spring 67. There are in all ten springs such as 66 and five such as 67.

If, as is usually the case, it is desired to select from a larger number group than is possible from one digit in ordinary notation, a method must be used employing two or more digits. Actually, the mechanism disclosed in the drawings is intended for use with eight-digit numbers. If these eight-digit numbers are in scale-of-ten notation, the total number of possible combinations to select from is 100,000,000. The means for coding the number information for eight-digit numbers will now be described referring particularly to Figs. 2, 4, 5 and 6.

It has already been disclosed how a two-out-of-five code may be magnetically impressed on any one segment of the code disc. In order to encode similar signals on successive segments of the code disc, it is only necessary to advance the disc through a suitable angular displacement after each impression. A means for accomplishing this is included in this disclosure and is illustrated most clearly in Fig. 5 in conjunction with Fig. 2.

Figure 5:
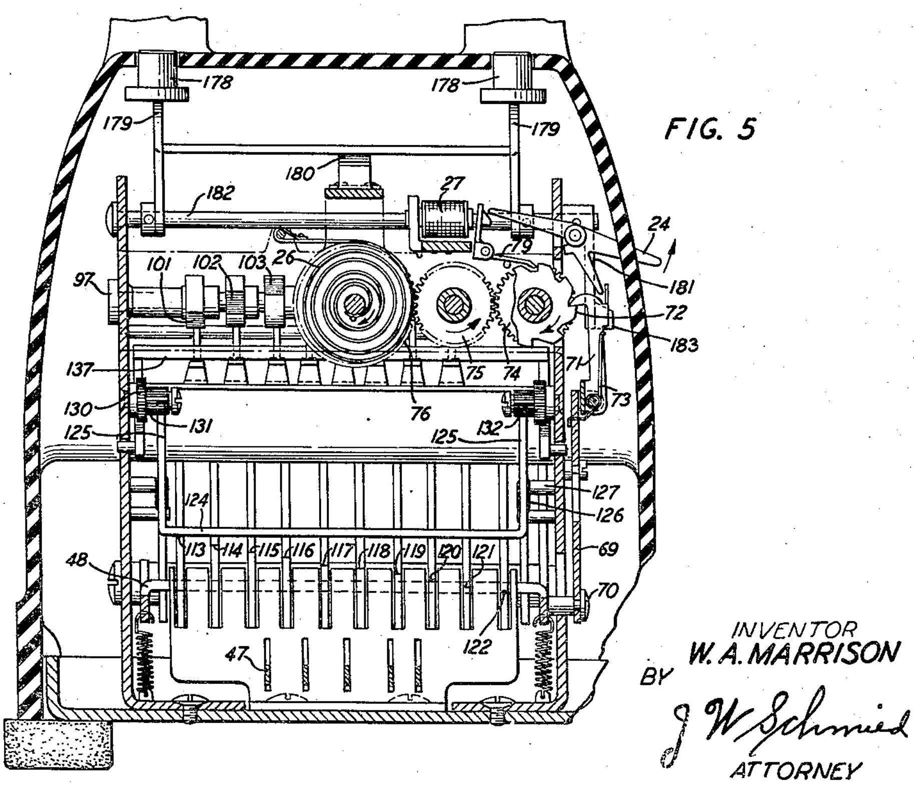

Referring now to Fig. 5, the rocker arm 48, already described in reference to Fig. 2, has a connecting rod 69 attached to it through connecting pin 70. This connecting rod operates a pawl 71 maintained normally in contact with ratchet 72 by spring 73. Eight operations of the pawl, corresponding to the registration of an eight-digit number, causes one complete revolution of the ratchet wheel. The ratchet wheel is integral with gear 74 which meshes with an idler gear 75 of any convenient dimension, which in turn meshes with gear 76 integrally connected to the code disc 30 shown on Fig. 2. As the keys are operated, and the corresponding number information is encoded on the code disc 30, a spring 26, attached at one end to the frame of the instrument, is tensioned, thus storing energy for the subsequent return of the disc to its initial position while generating an electrical signal corresponding to the impressed code.

In the embodiment shown, for the purpose of providing a stop to restrict the motion of the code disc to that portion providing a useful circuit function, the code disc is shown with the eight coding segments occupying the greater part of the revolution and with a small part devoted to the mechanical limiting function, being that portion of the disc which is not traversed by the generating coil. The actual mechanical stop may be in any convenient location, and for the purpose of this disclosure is shown in Figs. 2 and 6 by the pin 77 on the disc which engages the stop tab 78 on the frame. The same tab will, of course, limit the motion of the disc to something a little less than one revolution. Other stop devices well known in the art could be employed to limit the motion to exactly one revolution, and would not in any essential way affect the operation of the present invention. In the embodiment shown, the reduced angular motion of the code disc which compresses the eight registering sectors into somewhat less than 360 degrees is accomplished by making the gear 76 proportionately larger than gear 74.

As shown in Fig. 5 the restraining pawl 79 prevents the ratchet from slipping backwards during an operation of pawl 73. When the number is completely registered in code the ratchet and the code disc, are restrained in the set position by the two pawls 71 and 79. When both of these pawls are displaced from the ratchet wheel the code disc returns rapidly to its unwound position, thereby accomplishing the generation of the electrical code signal. This operation is described more fully hereinafter.

An important feature of this invention is a means for showing on a visual registering device the number that has been recorded on the code disc by the operation of a key or the successive operation of all eight keys comprising a complete number.

The visual recording is made on a set of usual type number wheels, in this case eight, corresponding to the eight digits of a complex number. In the illustrations presently to be described, only numerals are indicated for convenience in description. However, in accordance with the usual practice in designating telephone numbers, both numerals and letters could be used equally well. Two selection processes are required to actuate the visual indicator, namely, one which engages the number wheels in the correct sequence corresponding to the order of appearance of the digits in the complete number, and the other which rotates each number wheel in its turn to the indication corresponding to the key depressed. These selections must both be accomplished concurrently each time a key is operated.

Figure 4:
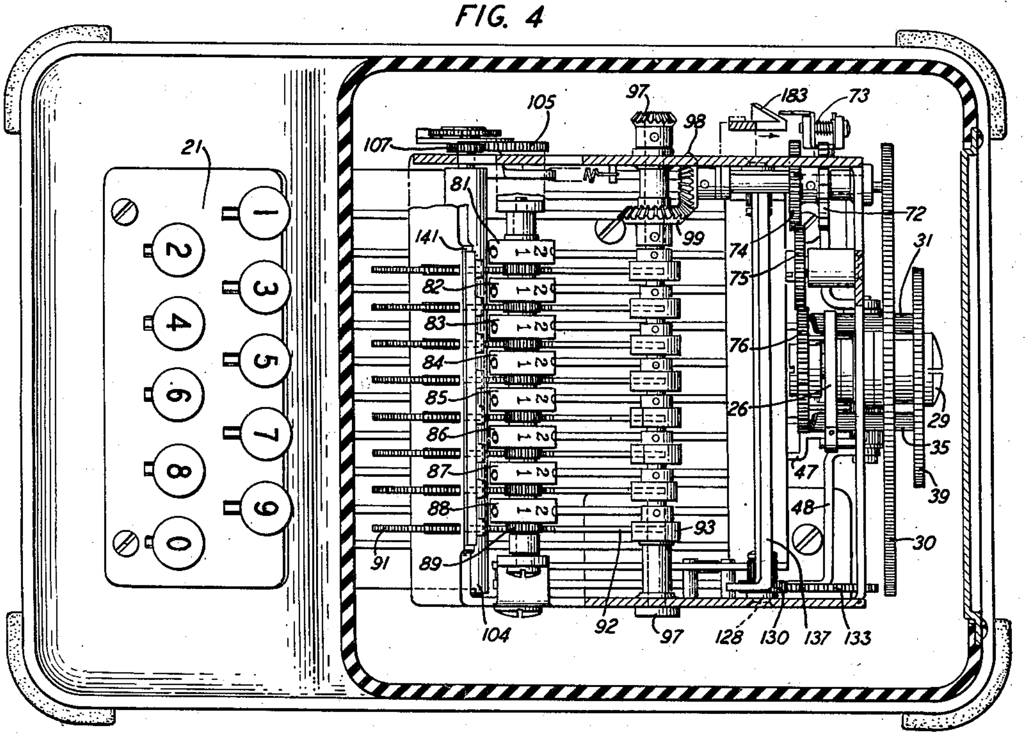

Referring to Figs. 2 and 4 it will be seen that the number whels 81—88 are each attached rigidly to a pinion gear such as 89, which in each case is in turn actuated by rack gears such as 91 of which there are eight, or one for each of the meshing number wheel pinions. Each rack gear is attached to, or is a part of, a sliding member 92 held in contact with cam 93 by a light spring 94 and having an elongated slot 95 which slides on a pin 96 attached to the frame of the instrument. This pin 96 serves as a fulcrum and guide for the motion of the sliding member 92.

The select operation which delegates the proper number wheel in relation to the digit sequence is performed by a series of eight cams such as 93, best illustrated in Figs. 4 and 5. All eight of these cams are rigidly attached to a common shaft rotating on center 97 and controlled, through the 1:1 bevel gears 98 and 99, to make one complete revolution when the ratchet wheel 72 makes one revolution. Each of the eight cams has one flat facet and, as shown at 101, 102 and 103 in Fig. 5, they are arranged 45 degrees apart in regular sequence. Thus, for each working position on the magnetizable code disc 30, a corresponding cam is in position with its flat surface below the shaft center and horizontal.

Of the eight sliding members such as 92 in Fig. 2, seven are resting against the curved surfaces of these cams, while the remaining one is pressed by the spring 94 toward the particular recess which is in the downward position. The resulting rotation of the sliding member about the fulcrum 96 permits it to engage the friction drive wheel 104, which is rotated in the direction that will move a sliding member from left to right in Fig. 2 when any key is operated. The friction drive wheel 104 may be a single roller extending the entire length of the eight number wheel assembly. It is rotated by gear segment 105, attached to lever 106, which meshes with pinion gear 107, in Fig. 4, associated with the roller shaft. This part of the mechanism may be seen more clearly in Fig. 7. In addition a ratchet 108 and pawl 109 are employed for the purpose of insuring that the roller always goes in one direction.

When any key is operated, the bar 49 is raised and the lever arm, comprising 48 and 106, is rotated about the center 50 against the restoring force of the spring 111. This rotates the pawl 109 in counter-clockwise direction indicated by the arrow in Fig. 7. The pawl 109 engages the ratchet 108 which is rigidly attached to the friction drive roller 104. When the operated key is released, the spring 111 restores the lever arm 106 to its normal position. The pawl 109 slips back to its normal position or ratchet 108 without further moving the friction roller 104.

The amount of rotation of the roller 104 is such that in moving any one of the sliding members 92 it could rotate a number wheel all the way from 1 to 0. The actual position at which the number wheel stops is regulated by any one of ten projections associated with the ten key bars. These projections are indicated as a group at 112 in Fig. 2 and individually as 113 through 122 in Fig. 5. When a key is operated, one of these projections moves upwards and moves the horizontal bar 124 an amount depending upon the height of the moved projection. This in turn moves the arm 125 through a proportionate angle about the center 50, as seen in Fig. 2. A restoring spring 126 insures the return of the arm 125 to the stop 127 at the completion of each key stroke.

The motion of the arm 125 causes rotation of the shaft 128 through the coupling between gear segment 129 on the arm 125 and the pinion gear 130 on the shaft 128. This shaft in turn drives two gears 131 and 132, seen in Fig. 5, which are coupled to the two rack gears 133 and 134. These rack gears together are joined through the sliding links 135 and 136 to the pusher bar 137, as may be seen in Fig. 2.

The sequence of operations by which the depression of a key registers the corresponding number on the proper number wheel is as follows. The same ratchet and pawl 72 and 71, seen in Fig. 5, which advance the code disc, also by means of bevel gears 138 and 139, in Fig. 2, select one of the number wheels by rotating the corresponding cam such as 93 so that its flattened surface is below its center of rotation and in a horizontal plane. This permits the number wheel driving member 92 to rotate through a small angle about the fulcrum 96 so as to engage the friction drive wheel 104 and so as to raise the lower tine of the fork 140 into the line of motion of pusher bar 137. Since the limiting horizontal position of the pusher bar 137 is determined by the height of the projecting member such as 113—122, corresponding to the key depressed, this will also determine the position that the engaged number wheel will be turned to at the completion of a key operation. It should be pointed out that the pusher bar 137 is positively driven to its limiting position, while the number wheel driving member 92 is driven by friction, hence the sole deciding factor in determining the number wheel position is the limiting position of the pusher bar.

A series of eight such operations is required to set up a complete eight-digit number. During each number registering operation, only one of the eight number wheel driving members 93 is engaged at a time. The design being such that the forks 140 of all seven other driving members may straddle the pusher bar 137 and so be unaffected by its motion.

Still referring to Fig. 2, a dog 141, associated with each number wheel driving member, is so located as to lock all of the members except one released by the cam 93. This is accomplished by the rocking motion of the member about the fulcrum 96 which moves the rack gear in mesh with the dog when the upper tine of the fork 140 rides on the round surface of the cam.

An additional feature of the invention is a system for calling party identification by means of a special signal transmitted from the calling party's terminal equipment. It would be of great value in central office circuit manipulations to be able to identify the original of a call without the necessity for identifying the circuits over while the call is routed. In the present invention this is accomplished by providing an extra code transmitter disc 39 having impressed upon it a fixed code corresponding only to the station in which it is mounted. The signal originating from the station identification disc is separable from the signal of the number calling disc by virtue of the difference in frequency of the two generated signals caused by the different angular spacing of the generating poles on the two discs. By electrical filtering means well known in the art the two signals are completely separable in central office equipment and may be directed into suitable channels for the storage of information on the one hand, and for the completion of the call on the other.

As a preferred arrangement it is proposed that the frequency generated by the number calling disc should be exactly twice the frequency generated by the station identification disc. This ratio of frequencies is fixed once for all in the construction of the discs and is not in any way dependent upon a rotational speed governing device.

The station identification code disc may be of simpler construction than the number calling disc because in the former there is no necessity for coding an office identification number group. A four segment disc is capable of sending individual identifications in a 9999 number group. The designation of the group as a whole should be unnecessary for identification purposes because that designation is the same for every member of the office group as well as of the apparatus making use of or directing the information. In the event that the calling party identification is relayed outside a particular office group, the group identification may be added by the relaying device. A suitable station identification code disc is illustrated in Fig. 6 by the disc 39.

The actual mode of operation of this disc 39 may be any one of several to accomplish the same purpose. For the purpose of illustration, in the embodiment shown, the disc 39 consists of some magnetic and permeable material such as soft iron or silicon steel or Permalloy, having teeth which serve as salient poles as previously described in reference to disc 30 and capable of rotation in the influence of the permanent magnet 37. The rotation of the disc thus causes variation of magnetic flux through the winding of a coil around magnet 37 and thereby produces the generation of a voltage across the terminals of the magnet coil 37. The frequency generated depends of course upon the spacing of the teeth and the angular velocity of the disc. Successful operation, however, is not critically dependent upon the actual frequency.

With teeth of constant shape and size no useful signal would be transmitted by this means. However, by modifying the teeth in suitable space sequence the generated wave may be varied in corresponding time sequence so as to convey specific information. In particular, the disc 39 in Fig. 6 is shown with teeth of variable height so as to cause amplitude modulation in the generated signal, variable between two distinctive amplitudes corresponding to "select" and "reject" in the two-out-of-five code already described in relation to Fig. 12. In this case, however, the code disc 39 is made once for all to conform to a certain number selection and can be changed only by replacing the disc. This can be accomplished readily by removing the screw 29 shown on Figs. 2, 4, 6 and 7 and replacing disc 39 entirely. The making of such discs to conform to any subscriber number is a simple matter using blanks provided with all teeth of full height which are filed, ground or punched by means of a suitable template to the proper pattern—an operation that may be performed readily by an installer or repairman.

The detection of such a signal as derivable from disc 39 may be accomplished readily at a central office by conventional methods and the storage and manipulation of such signals offer wide variations in use. Immediate applications are envisioned in automatic message accounting and in the recording and subsequent identification of special telephone information.

An additional function of the generator disc 39 is its provision of a phase standard in relation to the detection of signals coded on and transmitted from the other generator disc 30. It has been pointed out that the frequencies generated by these two discs 39 and 30 will be in some fixed ratio, and in the preferred embodiment here disclosed is in the exact ratio of two to one. That being the case, the signal from disc 39 may be employed at central office as a standard of phase for the purpose of detecting variations in phase in the signal from disc 30.

If disc 39 were intended to be used for this purpose alone, the current received at central office could be doubled in frequency, by any of several well-known means and compared in phase directly with the signal received from disc 30 by means of well-known phase detectors, in order to reveal the signals encoded as previously described on the segments of code disc 30. It should be noted that the effect of changing the polarity of the magnetization of the poles on the code disc 30 in the registering operation is to reverse the phase of the current generated by the disc when it is used to transmit the number information. Thus the coded signal which is transmitted and which contains the number information consists of a sequence of wave trains which may differ from each other in phase, but in no other essential manner. The reversal of phase obtained in the preferred embodiment of the invention is particularly easy to detect by reference to a signal from disc 39 and the resulting indication may be used in central plant equipment to operate relays, or to control the deflection of cathode ray beams, or to operate registration or storage or computing devices of many sorts.

As indicated above, the disc 39 may also be employed for the transmission of calling station identification signals as previously described. By employing amplitude modulation on disc 39, the signal received at central office may also be used as above to provide a standard of phase by the simple expedient of passing a portion of the signal through an amplitude limiting device which removes the amplitude modulation from that portion of the signal used as a standard of phase.

The self-synchronizing nature of the number signal is hereby stressed further in view of its importance and its many possible variants and applications. It is evident that at the transmitter the phase shift between the synchronizing signal from disc 39 and the number signal from disc 30 is invariable regardless of the actual speed of rotation of the generator in action. The performance of the instrument as described is therefore substantially independent of the speed of the generator unless limited in some way by the message handling properties of the receiving equipment. Moreover the effect of phase shift in the subscriber's loop should have negligible effect on the operation of the proposed system.

For example, if the two frequencies sent out from discs 39 and 30 were 300 cycles per second and 600 cycles per second respectively, the difference in phase shift over a 26 gauge subscriber's loop is only about 4 degrees per mile. In practical cases, therefore, the total differential phase shift between the two frequencies would be small enough to neglect in comparison with the 180-degree phase variation which characterizes the signal.

As a variation on the procedure just described it would be possible, without the use of disc 39, to detect the information contained in the signal from a disc only slightly modified from the form of disc 30. With disc 30 as shown, the information is stored magnetically on eight groups of magnetizable teeth, each group consisting of five subgroups, the main groups being separated by blank spaces for the purpose of putting time separations between the eight signal groups during transmission. The modification which would permit the use of the phase comparison method without the use of the auxiliary disc 39 and the extra transmission requirement for the auxiliary (lower) frequency, would be to insert permanently magnetized poles in a portion of each of the spaces on the periphery of disc 30 now shown blank, and so spaced that the current generated by them in the winding 36 would have the same frequency as the signal containing the number information. The signal coming from the extra, permanently magnetized teeth would be used to initiate the phase of an oscillator at central office whose frequency is regulated throughout the transmission of number signal by the number signal itself. This may be accomplished by well-known means as disclosed in my Patent No. 2,236,374, in spite of the phase reversals in the control signal. Having established this standard of phase at central office which is synchronized with the number transmitter, the detection of the phase modulated signal reduces to the same problem as already discussed in relation to the separately transmitted standard phase signal.

The use of the single disc method would be advantageous where the transmission of two widely separated frequencies is difficult or costly. However, any channel that is suitable for telephone voice communication is certainly suitable for the two-frequency method of the preferred embodiment herein disclosed unless of much greater length than ordinary subscribers' loops.

A variation of the code method of transmitting number information is now described which may be used to greatly increase the total number of selections that can be made and in addition to have other useful functions. This is based on the proposition that it is readily possible to discriminate between the ten members of the two-out-of-five code as a group and the ten members of the three-out-of-five code and hence to provide for a vigesimal number system where each digit may represent one out of twenty choices. In other words, this variation provides a scale-of-twenty number system which may be used to its fullest extent, providing in a complete eight-digit system a total of 25,600,000 different selections. Otherwise the arrangement may be used with certain restrictions which provide a somewhat smaller number of selections—but still assure a sufficient number for any purpose now contemplated. The embodiment of this invention which relates to this extended code will now be described with reference to Figs. 11 to 18, inclusive.

Fig. 11, already described, indicates one means by which the five select bars designated *a*, *b*, *c*, *d* and *e* may be operated selectively in pairs, by pairs of tabs, such as shown at 63 and 64, attached to the ten key-operated bars designated 1 to 0 and projecting into the space between the key bars and the select bars. The order of arrangement of these select tabs shown in Fig. 11 is displayed in diagram form in Fig. 12.

There is freedom in the choice of the correspondence between the digits represented and the actual code employed so that for the purpose of representing the digits, any sequence of the code combinations could be employed as long as each combination is used only once. When a certain order is chosen, however, it must be retained unless the receiving device at the central office is changed to correspond.

Since any advantageous order of the codes can be chosen in addition to that shown in Fig. 12, we may choose the one illustrated in Fig. 14 which has the property, if applied to a selecting device such as shown in Fig. 11, that the operation of any two adjacent numbered bars will operate three out of the five lettered bars. Moreover, the ten combinations of adjacent numbered bars counting 1 and 0 as adjacent, will select the ten possible combinations of three-out-of-five lettered code bars.

The new code thus produced, corresponding to the simultaneous operation of adjacent keys, is shown in diagram form in Fig. 16. As may be seen by inspection, the top row in Fig. 16 designated A corresponds to the first and second rows of Fig. 14 designated 1 and 2 in combination. Similarly E in Fig. 16 corresponds to 5 and 6 of Fig. 14, K corresponds to 0 and 2 and similarly for all the others.

Of the 3,628,800 different arrangements of the ten codes in Fig. 12, only a very small proportion has the property of the one illustrated in Fig. 16 as just described. It is evident that the transposition of any row in Fig. 14 from top to bottom or vice versa will have no effect on this property. Similarly, the transposition of any column from left to right or vice versa will leave this special property intact. Since any such transposition of rows and columns may be made in any order, we may find all of the possible transpositions of the pattern of Fig. 14 by applying a template of the proper size to portions of the larger pattern of Fig. 15. If, for example, the template is applied in position 143, the original pattern is obtained. If it is applied in any other parallel position, such as at 144, a different arrangement is obtained which has the same essential property as described above.

A mechanism is illustrated in Fig. 13 by means of which selections of two-out-of-five codes or three-out-of-five codes can be made simply by the operation of keys. One group of ten keys, designated from 1 to 0 inclusive, is used in the same way as in Fig. 11 to operate selections of the two-out-of-five code bars. The elliptical arrangement of keys is used for convenience of illustration and is only one of many arrangements which could be employed.

A second group of ten keys is shown in Fig. 13, designated from A to K (omitting letter I to avoid confusion with number 1); in association with the numbered keys 1 to 0 in such a way that the depression of any one of the lettered keys operates the two adjoining numbered keys. In the embodiment shown in Fig. 13 this is accomplished by means of tabs which project outward from the numbered keys in such a way that they may be engaged by the lettered keys in pairs as stated, the tabs projecting under the parts of the lettered keys which engage them.

By the aforementioned arrangement, the twenty keys comprising the two sets of ten may be operated with equal freedom of choice and since each of the twenty keys corresponds to a different signal which may be encoded on the number signal transmitter, it allows the use of a full scale-of-twenty number system designated herein a vigesimal system as distinguished from a decimal system.

Whereas for some purposes, the twenty-key array with its direct application to the scale-of-twenty number system, would be very advantageous, there may be other cases in which a simpler appearing and more compact keyboard would be desired. Such a case would be a telephone subscriber's station set designed predominantly for local dialing area calls, but provided so that long distance or nationwide dialing may be accomplished at will.

For such a purpose a simple key arrangement such as illustrated in Figs. 17 and 18 may be employed comprising a set of ten keys which ordinarily control the two-out-of-five code in a manner similar to the number-designated keys in Fig. 13 and an auxiliary lever designated 38 in Fig. 17 associated with an interlocking device which when operated couples each key with its own and with one adjacent key bar. The operation of this single lever converts the function of all ten keys from that of the ten number-designated keys of Fig. 13 to that of the ten letter-designated keys of the same drawing. It is clear that it would be possible to use this key arrangement for full scale-of-twenty operation by the appropriate use of the select lever 38, but for continued use in that way it would not be so convenient as the double keyboard in some form, operating as described in relation to Fig. 13.

The compact keyboard shown in Figs. 17 and 18 would be useful where the same telephone handset is used for both local and long distance "dialing." (The term "dialing" is used here for any mechanical act of the subscriber for number calling without a vocal request.) All local calls could be made as usual by the use of the ten keys in which each digit in the number called is a choice among the ten, 1 to 0 inclusive. Long distance calls may be differentiated from local calls in various ways of which the following is typical.

One procedure for long distance calling would be to operate the lever 38 preparatory to setting up a number so that the entire number would be set up on the code disc in three-out-of-five code. The extra operation required for making a long distance call would be of some advantage in avoiding inadvertent toll calling.

The operation of the keyboard illustrated in Figs. 17 and 18 is now described. The ten keys arranged in two parallel rows may be designated as indicated, each key being assigned a numeral and a letter. For example, the back row starting with key 145 is designated 1A, 2B, 3C, 4D and 5E, respectively, and the front row starting with key 146 is designated 0K, 9J, 8H, 7G and 6F. This arrangement is for convenience of discussion only, it having been suggested previously that any designation may be assigned to any key as long as the proper relationship between the codes is preserved. In the present embodiment of the invention, any order of appearance whatever of ten letters and ten numerals on the ten keys with one numeral and one letter to each key would be applicable.

The operation of key 145, which is identical with all other keys in the group of ten, will now be described. Assume that the lever 38 is in its extreme left-hand position so that all ten of the tabs such as 147 are disengaged from their adjoining keys. This is accomplished by rack gear 148 which moves with lever 38 engaging the ten pinions such as 149 to which the tabs such as 147 and 151 are attached. When the lever 38 is in its extreme right position, each of the tabs such as 147 and 151 is rotated into position to engage a projection such as 152 on the adjacent key-operated rod 153 associated with or part of the ten key bars previously described such as the ten numbered bars seen in Fig. 11.

The key-operated rods such as 153 and 154 have projections such as 152 attached rigidly to them, while the pinions such as 149 with their attached coupling tabs such as 151 are free to rotate within a small angle approximately 15 degrees under control of the lever 38. Thus moving the lever 38 to the right against the tension of spring 155 moves all of the ten tabs such as 147 and 151 into position to engage the next adjacent projections such as 156 and 152, respectively.

The upper part of a key such as 157 is in the nature of a cap that rides upon the gear 149 and fits loosely over the upper part of rod 154. The rod therefore can be depressed into operated position either by depressing a key directly by hand or by means of the projection below such as 159. For example, if the key rod 153 is operated from key 157 through the engagement of the coupling tab 151 with the projection 152, the key rod 153 will be operated without any sensible accompanying vertical motion of gear 160 of tab 161 or of the cap of key 162. The vertical motion of these inoperative parts is restrained by spring 163 attached to frame 164. A similar arrangement is used in connection with all ten keys so that the only motion of keys visible to an operator is of the individual keys operated manually.

A spring 155 is provided to leave the key coding lever 38 in normal two-out-of-five condition. This avoids the inadvertent use of the three-out-of-five code by making it necessary to operate lever 38 to obtain that code. The inclusion of spring 155 in this embodiment of the invention is optional, however, the desirability of using it depending upon the conditions of use for the number calling device as a whole.

It would be desirable, of course, to have the visual registration device indicate which number elements are coded in two-out-of-five code and which ones in three-out-of-five code. There are many possible ways to accomplish this such as by the use of a duplicate set of number wheels or by a set of indicators, one for each wheel, operated by the code changing device such as the lever 38 in Figs. 17 and 18. Means for so doing are not shown in detail herein because it is not essential for this embodiment of the invention.

When the code signal corresponding to a called number is received by central office, it is directed immediately in the local or long distance routing equipment by means of a code-type selector having only to discriminate between two-out-of-five code and three-out-of-five code classes.

Since the ability to discriminate between such code classes is an important part of any system employing the use of two code classes such as described here, one method for accomplishing such discrimination is illustrated in Fig. 19. The ordinary functions of detection, storage, delay and direction of the separate ten choices of signal in either class are well known in the art.

Referring now to Fig. 19, five relays 171—175 are associated with the five elements of the codes of which either a two-out-of-five signal or a three-out-of-five signal may be received. If a two-out-of-five signal is received, two of the five relays 171—175 will be operated, thus removing the short circuit from two of the five series resistors designated R which comprise bridge arm 167 in the Wheatstone bridge arrangement of the circuit. A polar relay 166 is provided to operate and close a circuit between contacts $C_1$ and $C_2$ if, for example, the resistance bridge arm 167 is lower than that of bridge arm 168 or to close circuit between contacts $C_1$ and $C_2$ if the resistance of arm 167 is higher than the resistance 168. With the other two bridge arms designated $R_0$ made equal it is evident that when two of the five circuits *a*, *b*, *c*, *d* and *e* are energized, contact $C_1$ will be closed through contact $C_2$ on polar relay 166, while when three of the five circuits are energized the bridge will be unbalanced in the opposite direction and contact $C_1$ will be closed through $C_3$ of the polar relay 166. This is sufficient to direct a signal entering at $C_1$ into either of two separate circuits connected with contacts $C_2$ and $C_3$, depending upon whether a particular signal is in two-out-of-five code or three-out-of-five code. The contact $C_2$ may then lead to the switching apparatus for local calling, and the contact $C_3$ to the apparatus for long distance calling—in one method of use. In place of the battery shown at 169, a source of power associated with the presence of a number signal could be substituted so that neither of the contacts $C_2$ or $C_3$ would be operated except on the arrival of a number signal.

If a greater operating margin or greater speed were required in the operation of relay 166, it could be accomplished by substituting for the arm 168 of the bridge a set of five series resistors each of resistance R having short circuiting leads going to a set of five independent make contacts on the five relays 171—175. This would have the effect of increasing the resistance of one arm when the other decreases and vice versa, and hence would approximately double the effective ampere turns on relay 166.

The purpose of Fig. 19 with the above description is to show one means by which the two code classes, two out of five and three out of five may be distinguished and treated separately. Similarly, circuits for accomplishing the same or similar functions have been proposed which operate wholly electronically and hence are capable of operating at higher signal speeds.

The description up to now has been concerned chiefly with the mechanism and its operation for recording a code representation of a number signal on a magnetizable disc, and for the visual registration of such number. Such registration is done at any time prior to making a call and is completed with the telephone handset in its resting place as shown at 177 in Fig. 2. The weight of the handset resting on the buttons 178 is employed to operate certain contacts, not shown, and a further mechanism which is shown in Figs. 2 and 5 by linkage 179. Normally, when the handset is in its place, the two pawls 71 and 79, seen in Fig. 5, are both operative so that the reciprocating motion of pawl 71, with each operation of a number key, causes the code disc 30 to rotate around step by step under control of the number keys until the entire number is registered.

When it is desired to make a call to the number registered the handset is removed from its resting place, thereby immediately setting the signal transmitting equipment in motion. The removal of the handset unlocks mechanically the pawl 71 from the ratchet 72 so that the only restraining element which prevents the code disc 30 from being returned to its unwound condition is the pawl 79. The pawl 79 is removed from ratchet 72 where electromagnet 27 is energized by current from central office.

Figures 7, 8:
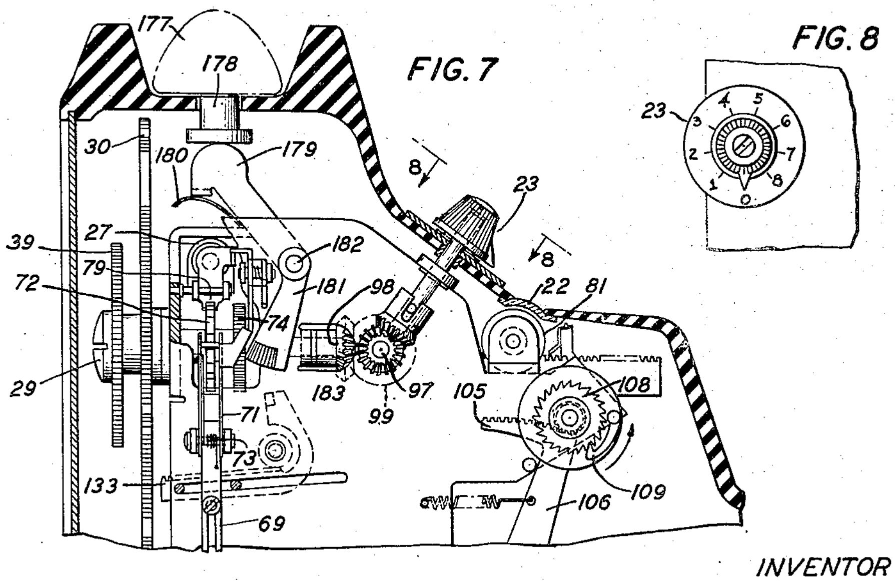
Fig. 7 is a side view profile section showing detail of the mechanism associated with the automatic release of the code disc advancing dog and some detail of the visual indicator device 23.
Fig. 8 shows detail of the knob and dial indicator 23 associated with the reset feature.

One form of mechanical unlocking device for the pawl 71 is illustrated in Figs. 2, 5 and 7. When the handset 177 is raised, the buttons 178 give way to the force applied by spring 180 rotating the compound lever arms 179 and 181 about the center 182. The motion of this lever removes the pawl 71 from the ratchet 72 by the action of the inclined plane 183.

When the handset is removed, a contact (not shown) is closed, the only purpose of which is to notify central office that a call is about to be made. The resulting current flow through this closed contact is used at central office to control apparatus to assign to that line for as long as necessary equipment for recording or directing the number information when received. As soon as such equipment is assigned, which may be a matter of thousandths or at most hundredths of a second, an impulse is sent from central office back to the subscriber's station which operates the electromagnet 27 and so removes the remaining pawl 79 from the ratchet 72 and thereby permits the recorder number information to be transmitted by rotation of the code disc 30 through one revolution being driven by the spring 26 as seen in Fig. 5. This entire operation is accomplished in a few hundredths of a second during which time the number information may be routed immediately by electronic switching means or stored on magnetic or other devices at central office.

There is not any tendency to operate the electromagnet 27 when the first contact is made upon removing the handset to initiate a call because any one of a number of means are used to avoid it. One such means is to have the initial central office receiving equipment potential-operated so that the first current flowing is too small to operate the magnet 27. Another means is to make the magnet a polar device, either by using permanent magnets in the pole structure or bilateral conducting devices associated with the windings. In this way a reverse current pulse from central office gives positive and selective operation. Such devices and their operation are old in the art.

As soon as a call is completed, the pawls 71 and 79 are returned to their operating positions engaging ratchet 72 and the set may be conditioned for a new call either by setting up a new number as already has been described or by rewinding the spring 26 preparatory to calling the same number again.

In order to condition the set for calling the same number repeatedly, it is only necessary to rotate the knob 23 of Figs. 1 and 8 one whole turn clockwise. This in effect rotates the magnetic code disc 30 through eight coding segments thus winding up spring 26 preparatory for release at any time by the pawls 71 and 79 as already described.

The knob 23 with its numbered dial serves as an indicator of the state of the number transmitter. As shown in Fig. 8, the dial is calibrated with numerals from 0 to 8 inclusive corresponding to the run-down condition and to the eight digit places in a complete number. When the knob points to 0 it indicates that the code disc has been returned to its unwound condition either by the normal sending of a number or by manual resetting. As a new number is coded by the appropriate operation of successive number keys, the numbers indicated on dial 23 show the progress of the number by digit places. For example, the knob pointing to number 4 indicates that the eight-digit number is half set up.

Whenever it is necessary to change a number after it has been set up ready for transmission, the apparatus may be released to operated position by means of the release lever 24 which is seen in Figs. 1 and 5. The manner of operation of this lever is shown clearly in Fig. 5, its purpose being merely to trip the two pawls 71 and 79 in order to release the ratchet 72 and allow the code disc 30 to be returned to operated position by the spring 26. After this simple operation, one merely presses the proper number keys to set up a new member automatically erasing the old record.

Although a precise speed control is not a part of the present invention, one feature of the invention being that it is operable over a wide range of speeds, it would be desirable to include some rough control to keep the rate within approximately 25 per cent of some nominal value. This would simplify the central office receiving equipment and could be accomplished simply in the subscriber's set by some conventional means such as a fan-fly governor or by a Faucault current governor. Nothing as elaborate or so precise as the governor used in the conventional form of dial device is required.

The number signal, as has already been stated, appears in the windings 36 and 37 of the two stator pick-up coils. These may be connected in series with the line permanently for the purpose of signaling and, if desired, short-circuited automatically from the talking circuit when a call is established, by means of a thermistor or a relay or any other suitable device.

Circuits for utilizing the present invention may be set up in a wide variety of forms making use of the versatility, high speed and convenience afforded by the various features described.

The basic invention would not be departed from by various structural modifications from those here described. For example, one could use any of the standard codes in the procedure described for storing a signal on a magnetizable disc. In particular, it would be possible to use any complementary pair of codes such as three-out-of-seven and four-out-of-seven instead of the pair described for the purpose of extending the usable number scale.

The scope of the invention includes the possible substitution of other magnetic materials or the substitution of other forms of magnetizable elements. For example, it would be entirely possible to employ a ribbon of vicalloy instead of the disc for storing the number code signals. The two edges of the magnetic ribbon could be used to store the two code signals used for calling party identification and for number calling by a change in structure but not in the mode of operation. Possibly a more compact structure might result from such modifications.

Another possible variation within the scope of the invention would be to determine the carrier frequency of the transmitted signal by impressing a plurality of magnet poles upon an otherwise homogeneous magnetizable medium by means of inductor magnets with serrated pole faces, instead of by providing salient poles on the generator rotor as here disclosed.

Still other modifications may be made by those skilled in the art without departing from the invention as disclosed by the specification and drawings and as defined by the appended claims.

What is claimed is:

1. A selective signaling generator comprising a movable member of magnetic material, a plurality of individual magnets adapted to be aligned with said movable member in different combinations of polarity in accordance with a prearranged code, means under control of a local operator for aligning said magnets in selected polar combinations adjacent to a portion of said movable member such that the adjoining portion of said member is magnetized in a pattern corresponding to the magnetic polarities of said aligned magnets, means for advancing said movable member in successive steps concurrently with successive realignments of said magnets, magnetic detection means in proximity to said magnetized portion of said movable member, and means for rapidly moving said magnetized member through the responsive field of said detection means whereby a distinctive electrical signal is generated in said detection means corresponding to the patterns of magnetization impressed upon said movable member.

2. A selective signal generator comprising a magnetizable member adapted to be advanced step by step under the control of a local operator, a plurality of rotatable magnets adapted to magnetize successive portions of said magnetizable member in distinctive patterns of differing magnetic polarity according to a predetermined code controlled by manipulations of a local operator, magnetic detection means adjacent a portion of said magnetizable member, and means operable subsequent to the magnetization of a plurality of successive portions of said magnetizable member for bringing such portions of said member successively within the field of said magnetic detection means whereby a distinctive electrical signal is induced in said detection means by said magnetized portions.

3. A selective signal generator comprising a rotatable disc of magnetic material, a plurality of separately rotatable magnets adapted to be rotated in various combinations into magnetic proximity with a portion of said rotatable disc whereby said disc portion is magnetized according to the polarity of said magnets, means under the control of a local operator for rotating said magnets in distinctive combinations corresponding to a predetermined code, further means operable incident to each rotation of said magnets for rotating said disc through a predetermined arc such that successive portions of said disc are successively magnetized by said distinctive combinations of magnets, magnetic detection means situated within the magnetic field of said magnetized disc, and means operable subsequent to magnetization of said disc for rapidly rotating said disc with respect to said magnetic detection means whereby a distinctive electrical signal corresponding to the various combinations of magnetism on said disc is induced in said detection means.

4. A selective signal generator comprising two rotatable discs of magnetic material adapted to rotate simultaneously as a unit, a permanently induced magnetic pattern on one of said discs corresponding to a predetermined number code individually distinctive of said signal generator, means under the control of a local operator for inducing selected magnetic patterns on the other of said discs corresponding to a selected number code to be generated, magnetic detection means adjacent each of said rotatable discs, and means operable subsequent to the induction of a number code on the second of said discs for rapidly rotating said discs through the fields of said detection means such that two distinctive electrical signals corresponding to the magnetic patterns impressed upon said discs are induced in said detection means.

5. A selective signal generator comprising first and second rotatable discs of magnetic material adapted to be rotated simultaneously as a unit, a permanently induced pattern of magnetism corresponding to a number of code individually distinctive of said generator impressed upon the first of said discs, a plurality of separately rotatable magnets adjacent a portion of the periphery of the second of said discs, said magnets adapted to be rotated in various combinations into magnetic proximity to the adjacent portion of the second of said discs whereby said adjoining second disc portion is magnetized according to the polarity of said aligned magnets, means under the control of a local operator for rotating said magnets in distinctive combinations corresponding to digits of a selected number code to be generated, further means operable incident to each rotation of said magnets for rotating said second disc through a predetermined arc such that successive adjoining portions of the periphery of said second disc are successively magnetized by said distinctive combinations of magnets, magnetic detection means situated within the magnetic fields of both of said magnetized discs, and means operable subsequent to magnetization of a complete number code upon said second disc for rapidly rotating both discs past said magnetic detection means whereby distinctive electrical signals corresponding to the various combinations of magnetism impressed upon both of said discs are induced in said detection means.

6. Selective signaling means comprising a movable magnetic member having two separately magnetizable parts, means for moving both parts of said magnetic member simultaneously, a distinctive pattern of magnetism corresponding to a number code for identifying said signaling means impressed upon one of said magnetizable parts, a plurality of separate magnets in proximity to a portion of the other part of said magnetizable member, said magnets individually adapted to be aligned in different combinations of polarity corresponding to the digits of a number code to be impressed upon said magnetizable member, means under the control of a local operator for aligning said magnets in selected combinations whereby a predetermined pattern of magnetism is induced in the adjoining portion of said magnetic member, means operable incident to each successive realignment of said magnets to advance said movable magnetic member to a different position with respect to said aligned magnets such that a different adjoining portion of said movable member is magnetized in a distinctive magnetic pattern by said realigned magnets, magnetic detection means adjacent both parts of said movable member, and means operable subsequent to the induction of magnetic patterns on said magnetic member for producing rapid motion of said member relative to said detection means such that a distinctive electrical signal corresponding to the magnetic patterns impressed upon said movable member is induced in said detection means.

7. A telephone subscriber's station set comprising a plurality of number keys, a plurality of code bars adapted to be operated in distinctive combinations by manipulation of any of said number keys, a plurality of movable magnets associated with said code bars and adapted to be individually moved in distinctive combinations into close proximity with a separately movable member of magnetizable material such that the portion of said separately movable member of magnetizable material adjacent to said movable magnets is magnetized in a distinctive pattern determined by the combination of magnets moved, means coupled with said number keys for advancing said separately movable member of magnetizable material step by step in response to successive operations of said number keys such that successive portions of said separately movable member of magnetizable material are magnetized in distinctive patterns determined by successive combinations of said magnets moved in close proximity to said member, a magnetic pick-up coil situated in close proximity to the magnetized portion of said separately movable member, and means operable subsequent to the complete magnetization of a plurality of magnetizable portions of said separately movable member for rapidly moving said member adjacent said pick-up coil in such manner that the plurality of distinctive magnetic patterns on said member induce a distinctive electrical signal in said pick-up coil.

8. A telephone subscriber's station set comprising a plurality of number keys, a plurality of code bars adapted to be operated in distinctive combinations by manipulation of any of said number keys, a plurality of rotatable magnets associated with said code bars and adapted to be individually rotated in either of two directions depending upon the operation or non-operation of said associated code bars, a movable member of magnetizable material located in close proximity to the poles of said rotatable magnets in their rotated positions such that the adjacent portion of said movable member is magnetized in a distinctive pattern determined by the combination in which said magnets are rotated by operation of said number keys, means coupled with said number keys for advancing said movable member of magnetizable material step by step in response to successive operations of any of said number keys whereby successive portions of said movable member of magnetizable material are magnetized in distinctive patterns determined by successively rotated combinations of said magnets, a magnetic pick-up coil situated in close proximity to the magnetized portions of said movable member of magnetizable material, and means operable subsequent to the complete magnetization of a plurality of magnetizable portions of said movable member for rapidly moving said member with respect to said pick-up coil in such manner that the distinctive combinations of magnetic patterns impressed upon said movable member induce a distinctive electrical signal in said pick-up coil.

9. A telephone subscriber's station set comprising ing a plurality of number keys, a plurality of code bars adapted to be operated in distinctive combinations by manipulation of any of said number keys, a plurality of rotatable magnets associated with said code bars and adapted to be individually rotated in either of two directions depending upon the operation or non-operation of said associated code bars, a rotatable member of magnetizable material having a portion of its periphery in close proximity to either north or south poles of said rotatable magnets in their rotated positions depending upon the direction of rotation of each of said magnets, means coupled with said number keys for advancing said rotatable member of magnetizable material step by step through predetermined arcs in response to successive operations of said number keys whereby successive portions of the periphery of said rotatable member of magnetizable material are magnetized in distinctive patterns determined by the rotated combinations of said magnets, a magnetic pick-up coil located in close proximity to the magnetized periphery of said rotatable member, and means operable subsequent to the complete magnetization of a plurality of magnetizable portions of said rotatable member for rapidly rotating said member in relation to said pick-up coil in such manner that the distinctive patterns of magnetism impressed upon said rotatable member induce a distinctive electrical signal in said pick-up coil.

10. A telephone subscriber's station set comprising a plurality of number keys, a plurality of code bars adapted to be operated in distinctive combinations by manipulation of any of said number keys, a plurality of rotatable magnets associated with said code bars and adapted to be individually rotated in either of two directions depending upon the operation or non-operation of said associated code bars, a first rotatable member of magnetizable material having a portion of its periphery in close proximity to the magnetic poles of said rotatable magnets in their rotated positions such that distinctive patterns of north and south magnetism are induced in said portion as determined by the direction of rotation of each of said magnets, means coupled with said number keys for advancing said rotatable member of magnetizable material step by step through predetermined arcs in response to successive operations of said number keys such that successive portions of the periphery of said rotatable member of magnetizable materials are magnetized in distinctive patterns of north and south polarity determined by the rotated combinations of said magnets as controlled by operation of said number keys, a second rotatable member of magnetic material having impressed thereon a distinctive pattern of magentism corresponding to a number code individual to said subscriber's station whereby said station is identified, magnetic pick-up coils located in close proximity to the magnetized peripheries of each of said rotatable members, and means operable subsequent to the magnetization of a plurality of magnetizable portions of said first rotatable member for rapidly rotating both said first and second members with reference to their respective pick-up coils in such manner that the magnetism impressed upon said rotatable members induces distinctive electrical signals in each of said pick-up coils, and further means for combining each of said induced signals into a composite electrical current to be applied to a communication circuit.

11. A telephone subscriber's station set comprising a plurality of number keys, a plurality of code bars adapted to be operated in distinctive combinations by manipulation of any of said number keys, a plurality of rotatable magnets associated with said code bars and adapted to be individually rotated in either of two directions depending upon the operation or non-operation of said associated code bars, a plurality of visible number indicating wheels associated with said code bars and said rotatable magnets in such manner that said wheels are individually rotated successively by successive operations of said number keys to indicate which keys are operated and in what order, a rotatable member of magnetizable material having a portion of its periphery in close proximity to the poles of said rotatable magnets in their rotated positions such that said position of said member is magnetized in a distinctive pattern of north and south polarity determined by the direction of rotation of each of said magnets, means coupled with said number keys for advancing said rotatable member of magnetizable material step by step through predetermined arcs concurrently with successive operations of said number keys and said number wheels such that successive portions of the periphery of said rotatable member of magnetizable material are magnetized in distinctive patterns determined by successive combinations of said rotated magnets, a magnetic pick-up coil located in close proximity to the magnetized periphery of said rotatable member, and means operable subsequent to magnetization of a plurality of portions of said magnetizable member for rapidly rotating said member with respect to said pick-up coil in such manner that magnetic lines of force from the distinctive magnetic patterns impressed upon said rotatable member induce a distinctive electrical signal in said pick-up coil.

12. A telephone subscriber's station set comprising a plurality of number keys, a plurality of code bars adapted to be operated in distinctive combinations by manipulation of any of said number keys, a plurality of rotatable magnets associated with said code bars and adapted to be individually rotated in either of two directions depending upon operation or non-operation of said associated code bars, a plurality of visible number indicating wheels associated with said code bars and said magnets in such manner that said number wheels are individually rotated in successive operation of said number keys in such manner that said number wheels indicate which number keys are operated and in what order, a first rotatable member of magnetizaable material having a portion of its periphery in close proximity to one pole of each of said magnets in their rotated positions, means coupled with said number keys for advancing said rotatable member of magnetizable material step by step through predetermined arcs concurrently with successive operations of said number keys and said number wheels such that successive portions of the periphery of said rotatable member of magnetizable material are magentized in distinctive patterns of magnetic polarity determined by successive combinations of said rotated magnets, a second rotatable member of magentic material having impressed upon its periphery a distinctive pattern of magentism corresponding to an identifying number code individual to said subscriber's station, magnetic pick-up coils located in close proximity to each of said rotatable magnetic members in such manner as to be within the fields of magnetism impressed upon said members, and means operable subsequent to complete magnetization of a plurality of magnetizable portions of said first rotatable member for rapidly rotating both of said members with respect to said pick-up coils in such manner that distinctive electrical signals are induced in said coils.

13. A telephone subscriber's station set comprising a plurality of number keys, a plurality of code bars adapted to be operated in distinctive combinations by manipulation of any of said number keys, a plurality of rotatable magnets associated with said code bars and adapted to be individually rotated in either of two directions depending upon operation or non-operation of said associated code bars, a plurality of number indicating wheels visibly displayed in association with said number keys, said number wheels connected with said code bars and said rotatable magnets in such manner that said wheels are individually rotated in succession by successive operations of said number keys to indicate by the numbers displayed on said wheels which number keys have been operated and in what order, a rotatable member of magnetizable material having a portion of its periphery in close proximity to one pole of each of said magnets in their rotated positions, the polarity of each of said magnets depending upon the direction of rotation of each magnet in response to operation of its associated code bars, means coupled with said number keys for rotating said rotatable member of magnetizable material step by step through predetermined arcs against the restraining force of a previously tensioned spring, said successive partial rotations of said rotatable member being achieved concurrently with successive operation of said number keys such that successive portions of the periphery of said rotatable member of magnetizable material are sequentially brought into magnetic proximity with said rotatable magnets in each of their successive rotated positions whereby different portions of the periphery of said rotatable member are magnetized in distinctive patterns of magnetic polarity determined by successive combinations of said rotated magnets, restraining means to hold said rotatable member in each position to which it is rotated, means controlled by electrical current from a distant office to release said restraining means, a magnetic pick-up coil located in close proximity to the magnetized periphery of said rotatable member, and means including said release means and said pretensioned spring operable subsequent to the magnetization of a portion of said rotatable member for causing rapid rotation of said member with respect to said pick-up coil in such manner that the pattern of magnetization impressed upon said rotatable member induces a corresponding electrical signal in said pick-up coil.

14. In a telephone subscriber's station set the combination comprising a rotatable member of magnetizable material, means including a plurality of keys under the control of a local subscriber for impressing a plurality of distinctive magnetic patterns corresponding to the code number of a station to be called upon said rotatable member, a pick-up coil in magnetic proximity to the magnetized portions of said rotatable member, and means controlled by a distinctive signal from a distant office for causing rapid rotation of said magnetized rotatable member with respect to said pick-up coil in such manner that a distinctive electrical signal corresponding to the call number magnetically registered upon said rotatable member is induced in said pick-up coil.

15. In a number code signal generator, means for generating a plural digit number code signal in a decimal system comprising a number key for each character of a digit, a plurality of code bars operable in different combinations by operation of each key, a plurality of movable magnets associated with said code bars in a manner to be moved into distinctive groupings by operation of each different combination of code bars, a separately movable member of magnetizable material in close proximity to said magnets in their moved positions such that a portion of said member is magnetized in a pattern of magnetic lines of force determined by the combined grouping of moved magnets, means for advancing said movable member in sequential steps upon each successive operation of said number keys such that different portions of said member are magnetized in distinctive patterns by each successive group combination of said movable magnets, a magnetic pick-up coil located in close proximity to said successively magnetized portions of said movable member, and means operable subsequent to complete magnetization of any predetermined number of portions of said member for causing rapid movement of said member with respect to said pick-up coil such that the patterns of magnetic lines of force registered upon said movable member induce a distinctive electrical signal in said pick-up coil corresponding to the code of the decimal digits sequentially registered by operation of said number keys.

16. In a number code signal generator, means for generating a plural digit number code signal according to a vigesimal system of number notation comprising first and second sets of number keys, coupling means for operating two keys in said first set by operation of any one key in said second set, a plurality of code bars operable by the keys of either set in a distinctive combination for each key, a plurality of movable magnets associated with said code bars in a manner to be moved into distinctive groups by operation of each different combination of code bars, a separately movable member of magnetizable material in close proximity to said magnets in their moved positions and so constructed and adapted that a portion of said movable member is magnetized in a pattern of magnetic lines of force determined by the combination of moved magnets, means for advancing said movable member in sequential steps upon each successive operation of a number key in either of said sets, such that different portions of said member are magnetized in distinctive patterns by each successive combination of said movable magnets, a magnetic pick-up coil located in close proximity to said sequentially magnetized portions of said movable member, and means operable subsequent to complete magnetization of any predetermined number of portions of said member for causing rapid movement of said member with respect to said pick-up coil in such manner that the patterns of magnetic lines of force registered upon said movable member induce a distinctive electrical signal in said pick-up coil corresponding to the code of the vigesimal digits magnetically registered by operation of said number keys.

17. In a number code signal generator, means for generating a plural digit number code signal in both decimal and vigesimal systems of notation comprising first and second sets of number keys for each character of a digit, said first set of keys operable independently of said second set, coupling means associated with each of said keys in such manner that operation of any key in said second set causes two adjacent keys in said first set to be operated, a plurality of code bars operable by said keys, a different combination of said code bars responding to operation of each different key, a plurality of movable magnets associated with said code bars in a manner to be moved into distinctive groups by operation of each different combination of code bars, a separately movable member of magnetizable material in close proximity to said magnets in their moved position such that a portion of said member is magnetized in a pattern of magnetic lines of force determined by the combined group of moved magnets, means for advancing said movable member in sequential steps upon each successive operation of said number keys such that different portions of said member are magnetized in distinctive patterns by each successive group combination of said movable magnet, a magnetic pick-up coil located in close proximity to said successively magnetized portions of said movable member, and means operable subsequent to complete magnetization of any predetermined number of portions of said member for causing rapid movement of said member with respect to said pick-up coil in such manner that the patterns of magnetic lines of force registered upon said member induce a distinctive electrical signal in said pick-up coil corresponding to the code of the number digits sequentially registered by operation of said number keys.

18. In a number code signal generator, means for generating a plural digit number code signal according to decimal and vigesimal systems of notation comprising a plurality of number keys each adapted to operate a plurality of code bars in either of two distinctive code combinations peculiar to each key, a plurality of code bars operable in a number of different combinations corresponding to twice the number of said keys, two different combinations of code bars being operable by operation of any one key, separately operable means for selecting either code combination upon operation of any key, a plurality of movable magnets associated with said code bars in a manner to be moved into distinctive combinations by operation of each different combination of code bars, a separately movable member of magnetizable material in close proximity to said magnets in their moved positions such that a portion of said member is magnetized in a pattern determined by the combination of moved magnets, means for advancing said movable member in sequential steps upon each successive operation of said number keys in such manner that different portions of said member are sequentially magnetized in distinctive patterns by each successive combination of moved magnets, a magnetic pick-up coil located in close proximity to said successively magnetized portions of said movable member, and means operable subsequent to complete magnetization of any predetermined number of portions of said member for causing rapid movement of said member with respect to said pick-up coil such that the distinctive patterns of magnetism registered upon said movable member induce a distinctive electrical signal in said pick-up coil corresponding to the numerical code of the digits sequentially registered by operation of said number keys.

WARREN A. MARRISON.

REFERENCES CITED

The following references are of record in the file of this patent:

UNITED STATES PATENTS

| Number | Name | Date |
|---|---|---|
| 2,307,965 | Shepherd | Jan. 12, 1943 |
| 2,346,305 | Hickman | Apr. 11, 1944 |
| 2,403,009 | McCann | July 2, 1946 |
| 2,406,353 | Myers | Aug. 27, 1946 |
| 2,416,445 | Jensen | Feb. 25, 1947 |
| 2,416,715 | Richard | Mar. 4, 1947 |
| 2,431,646 | Kenney | Nov. 25, 1947 |